May 16, 1967 W. H. BACH 3,320,371

VIDEO TAPE RECORDING APPARATUS UTILIZING TRANSVERSELY SCANNING ERASE AND RECORD HEADS

Filed Jan. 8, 1963 2 Sheets-Sheet 1

INVENTOR.
WALTER H. BACH
BY Zulwider, Patton, Rieber, Lee, and Utecht
ATTORNEYS

INVENTOR.
WALTER H. BACH
BY Zulwider, Patton, Rieber
Lee, and Utecht
ATTORNEYS

United States Patent Office 3,320,371
Patented May 16, 1967

3,320,371

VIDEO TAPE RECORDING APPARATUS UTILIZING TRANSVERSELY SCANNING ERASE AND RECORD HEADS

Walter H. Bach, Los Angeles, Calif., assignor to Bach Auricon, Inc., Los Angeles, Calif., a corporation of California Filed Jan. 8, 1963, Ser. No. 250,077
3 Claims. (Cl. 179—100.2)

This invention relates generally to apparatus for magnetically recording signals upon a tape medium, and more particularly to a new and improved video tape recording apparatus of the type wherein television signals or the like are recorded as successive transverse tracks or traces across the width of a magnetic tape.

In recent years, video tape recording has become extremely popular in the television industry for prerecording programs, reruns, special events coverage, test programs, and delayed program transmission for different network station time zones. In this regard, video tape recording possesses advantages over other well known techniques, such as kinescope recording, in that it produces a record which is usable immediately without further processing, and also may be erased by demagnetization for subsequent reuse.

Unfortunately, apparatus heretofore available for recording video signals upon a magnetic tape has suffered from a number of deficiencies which contribute to the distortion level of the recorded signals. For example, typical arrangements of the prior art for recording successive transverse tracks across a magnetic tape have included means for longitudinally advancing the tape while simultaneously and continuously reciprocating an appropriate recording transducer, or transducers, across the width of the tape. In the course of being so reciprocated, the recording transducer is physically separated from the magnetizable area of the tape, at the end of each transverse track, and must subsequently re-engage the magnetizable area in retracing to begin a subsequent transverse track.

The above-described successive making and breaking of contact between the transducer and the tape, or with a magnetic coating thereon, causes the tape to undulate or oscillate, thereby introducing a considerable amount of bounce and flutter distortion in the recorded signal.

In addition to the foregoing difficulty, the sudden change in magnetic reluctance when a recording transducer enters or leaves a magnetizable area of the tape produces circuit transients which also affect the quality of the recorded signal. In this latter regard, attempts to temporarily disconnect the transducers from the electrical recording circuit during periods when the transducer is not in contact with a magnetizable area of the tape, introduce switching transient problems of their own.

Another problem encountered in conventional magnetic video recorders of the intermittent contact type is that the transducers, which of necessity move at a high speed relative to the tape, must be arranged to make a low-angle "glancing" contact with the tape at the beginning of each trace and must leave the tape at a similar small angle of tangency. This, in turn, necessitates very careful guiding of the tape at a carefully controlled distance from the rotary "head wheel" which carries the rotating transducers.

Even with great care in guiding the tape, minor variations in tape thickness and the like, cause relatively inordinate errors in the "entering" and leaving points of the successive traces which, in turn, results in distortion of the reproduced signal.

Accordingly, it is an object of the present invention to provide a new and improved video tape recording apparatus which overcomes the above and other disadvantages of the prior art.

Another object is to provide an improved video tape recording apparatus in which recording transducers are never required to leave and re-enter the magnetic tape between successive traces.

A further object of the invention is the provision of a tape recording apparatus, for laying down successive transverse traces across a magnetic tape, wherein each recording transducer is always maintained in physical contact with a magnetizable portion of the tape, even between successive traces.

Still another object is to provide an improved video tape recording device, for laying down transverse traces, wherein successive traces are more closely spaced, and recorded signal distortion at the beginning and end of each trace is minimized.

Yet another object of the present invention is the provision of an improved tape recording apparatus of the multiple-head, successive trace type in which a clear demagnetized path is automatically provided upon the tape for each recording transducer as it traverses the tape.

A still further object of the invention is to provide an improved video tape recording apparatus in which variable reluctance and switching transients are substantially eliminated.

The above and other objects and advantages of this invention will be better understood by reference to the following detailed description when considered in connection with the accompanying drawings of illustrative embodiments thereof, wherein.

Figures 1, 2, 3, 4, 5:
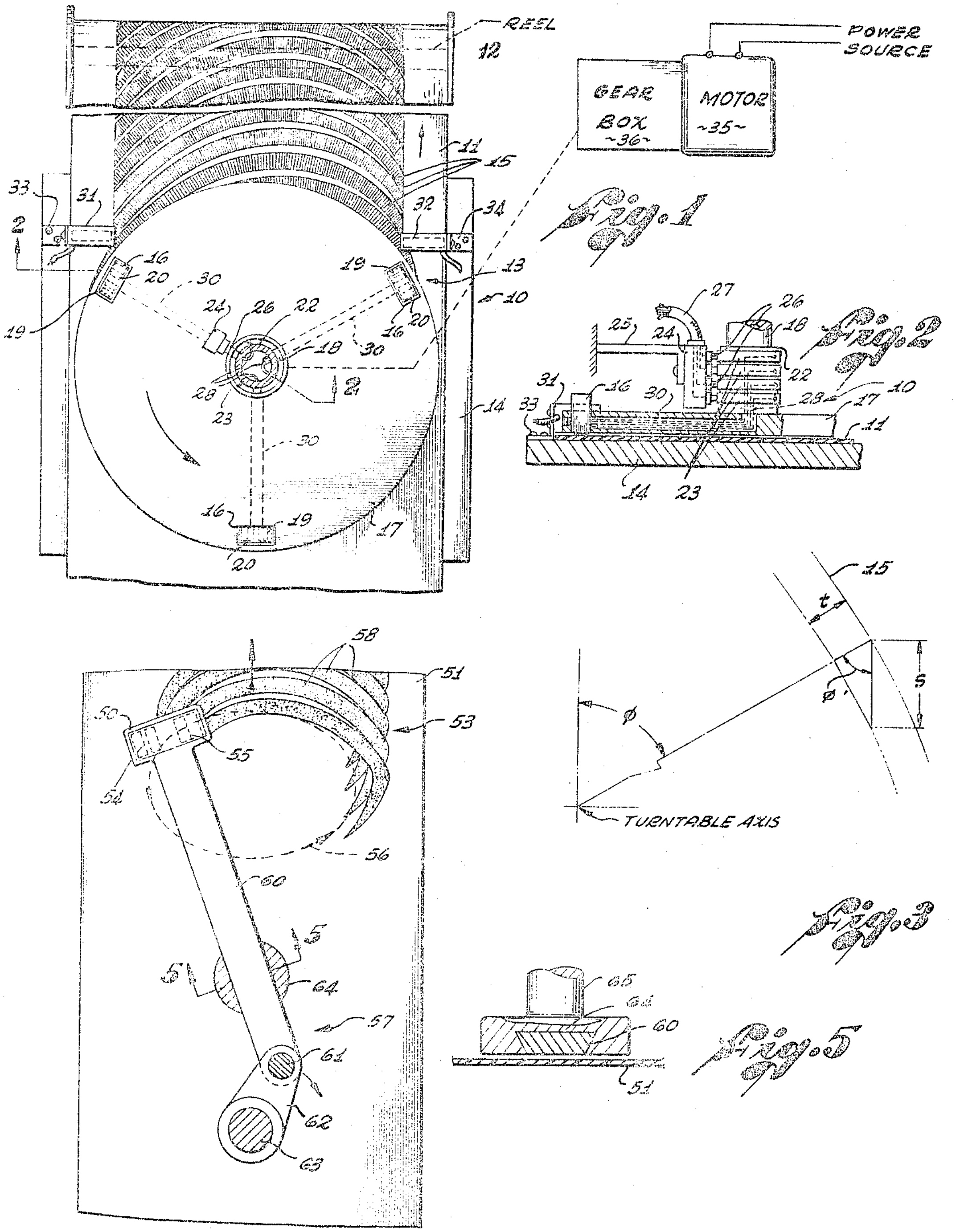
FIGURE 1 is a partial plan view of a presently preferred embodiment of the invention using a plurality of revolving transducer assemblies.
FIGURE 2 is a fragmentary sectional view, taken along the line 2—2 of FIGURE 1, illustrating the mechanical drive arrangement and means for supplying electrical signals to the transducer assemblies shown in FIGURE 1.
FIGURE 3 is a trigonometric diagram illustrating the mathematical correlation between longitudinal travel of the tape and the spacing between adjacent recorded tracks in the arrangement of FIGURE 1.
FIGURE 4 is a partial plan view of an alternative embodiment of the invention, in which a single transducer assembly traverses a magnetic tape in an elliptical path.
FIGURE 5 is a sectional view, taken along the line 5—5 of FIGURE 4, and illustrates the connection between the lever arm and the pivot post of the arrangement shown in FIGURE 4.

Referring now to the drawings, and particularly to FIGURES 1 and 2 thereof, there is shown a video tape recording apparatus 10 in accordance with the invention and in which a magentic recording tape 11 is longitudinally advanced by any appropriate tape drive means, such as a take-up reel 12 or the like, past a recording station 13.

The tape 11 may be supported as shown at the recording station 13 upon a smooth, low-friction base member or platen 14, or the tape may be merely maintained in tensile catenary suspension between a pair of conventional tape supporting guide rollers (not shown). In this regard, any suitable manner of support for the magnetic tape 11 at the recording station 13 may be utilized without departing from the spirit and scope of the present invention.

As the tape 11 is advanced past the recording station 13, a plurality of transverse, arcuate, magnetically recorded tracks or traces 15 are laid down across the tape by each of a plurality of revolving transducer assemblies 16 which physically contact the tape at all times during the recording process. Since the tape 11 is being advanced longitudinally past the recording station while the transducer assemblies 16 are being rotated, each of the recorded tracks 15 represents a portion of the cycloidal locus traced by a transducer assembly upon the tape.

The transducer assemblies 16 are carried in and extend slightly below the lower surface of a rotatable disc or turntable 17 which is, in turn, secured at its axis of rotation to a hollow drive shaft 18. The transducer assemblies 16 are disposed uniformly upon the turntable 17 both as to angular spacing about the drive shaft 18 and as to radial distance from the drive shaft. The drive shaft 18 is centrally disposed over the middle of the tape 11, and the radial distance from the center of the drive shaft to the outermost extremity of each transducer assembly 16 is slightly less than half of the width of the effective recording area of the tape.

In this manner, when the turntable 17 is rotated, each of the transducer assemblies 16 will always remain within the physical boundaries of the effective recording area of the tape 11.

Each of the transducer assemblies 16 includes an erase head 19 and a recording head 20 of compact, but conventional, design. The erase head 19 is positioned within the transducer assembly 16 so that it leads its respective recording head 20 in the circular path of motion followed by the transducer assembly in traversing the magnetic tape 11, i.e., the turntable is shown rotating counterclockwise in FIGURE 1, and the erase head 19 is to the left at the top of its path in FIGURE 1. If it were desired to rotate the turntable 17 in a direction opposite to that indicated in FIGURE 1, the positions of the heads 19 and 20 in each of the transducer assemblies 16 would have to be reversed.

During the recording process, while the turntable 17 and transducer assemblies 16 are rotating, an electrical erase signal is continuously directed to each of the erase heads 19, all of which are electrically connected to a common signal source. In this manner, the tape 11 is always automatically demagnetized by the erase heads 19 to eliminate spurious signals in the area and along the paths which the recording heads 20 subsequently follow in laying down the transverse recorded traces 15. Similarly, all of the recording heads 20 are also electrically connected to receive a common continuous recording signal.

The aforedescribed arrangement simultaneously eliminates bounce and flutter distortion, as well as distortion introduced by variable reluctance or switching transients. Since the radial distance from the axis of rotation of the turntable 17 to the outermost extremity of each of the transducer assemblies 16 is less than half of the magnetizable width of the tape 11, no portion of the transducer assemblies ever breaks physical or magnetic contact with the tape 11. Hence, the tape is never caused to oscillate or undulate by virtue of transducers leaving and re-entering the tape or crossing the physical boundaries which may exist between magnetic and non-magnetic portions thereof.

Switching transients are, of course, wholly eliminated by the arrangement of FIGURE 1, since all of the recording heads 20 receive a continuous recording signal and are never switched in and out of the electrical circuit. Such continuous recording by the recording heads 20 means that these heads will record continuous, overlapping cycloidal traces on the back strokes as well as the forward strokes in traversing the tape 11. However, it will be recalled that the erase heads 19 automatically provide a clear, demagnetized path for each recording head. Hence, any cycloidal traces which are recorded upon the back stroke will be automatically erased by the heads 19 whenever any portion of the tape 11 containing a back stroke trace has advanced longitudinally to a position in which a forward stroke trace 15 is to be laid down across the tape.

Since each of the heads 19, 20 of the transducer assemblies 16 is to be supplied with erase and video recording signals, respectively, suitable means must be provided to supply these signals to the transducers while the turntable 17 is rotating. Such means are well known in the art and include slip ring arrangements as well as inductive or capacitative coupling expedients.

By way of example, typical slip ring arrangement is shown in FIGURE 2. In this regard, the drive shaft 18 carries upon its outer circumference a concentric insulating sleeve 22 which, in turn, carries thereupon a plurality of axially spaced and electrically conductive slip rings 23.

A brush holder 24 is fixed in a stationary position adjacent the slip rings 23 by any suitable bracket means 25. The brush holder 24 carries a plurality of brushes 26, one for each of the slip rings 23, which contact the slip rings and supply electrical power thereto.

Appropriate signals are directed along a conduit 27 to each of the brushes 26 and, thereby, to appropriate slip rings 23 as the drive shaft 18 rotates. Electrical connections between each of the transducer assemblies 16 and the slip rings 23 are made via a plurality of electrical leads 28. These leads 28 contact the slip rings 23, through the interior of the hollow drive shaft 18, and extend through a plurality of radial channels 30 provided in the turntable 17, one for each of the transducer assemblies 16, and which span the distance between the drive shaft and each transducer assembly.

With the video tape recording arrangement of FIGURE 1, in which the three transducer assemblies 16 are spaced at 120° intervals about the drive shaft 18, retrace time between recording of successive traces 15 is completely eliminated. However, since each recording head 20 is recording the same signal at any given moment, and as shown in the drawings, will lay down a cycloidal arc of substantially 180° (instead of 120°) upon the forward recording stroke, there will be an overlap or duplication of recorded signals in the adjacent cycloidal tracks 15 laid down by successively passing recording heads.

Such signal duplication serves no useful purpose, affects the intensity of the playback signal in a nonuniform manner, and also reduces the number of successive cycloidal tracks 15 which can be recorded per unit length of the tape 11 without physical overlap of adjacent recorded tracks. Therefore, since the transducer assemblies 16 are spaced 120° apart, continuity of the recorded signal between adjacent tracks 15 will be maintained if each recorded track corresponds to only 120° of transducer rotation about the drive shaft 18.

To accomplish such recording continuity without using complex electrical switching expedients, each recording head 20 is permitted to lay down its normal 180° recorded track. However, a pair of auxiliary, stationary erase heads 31, 32 are secured to the platen 14 at 33, 34, respectively, and overlay the edges of the tape 11 at positions downstream from the recording station 13 in the direction of tape travel. These erase heads 31, 32 receive appropriate demagnetizing signals to clear the edge of the tape and leave portions of the cycloidal recorded tracks 15 corresponding only to 120° of transducer rotation.

While the invention has been illustrated and described for three transducer heads or assemblies uniformly disposed at 120° intervals, any number of uniformly disposed heads may be used, i.e., four heads could be used at 90° intervals, in which case the tape 11 would be erased by the downstream heads 31, 32 so as to leave portions of the recorded tracks 15 corresponding to only 90° of transducer rotation. The three-head arrangement shown is usually preferable for continuous signal recording since it entails a minimum width of edge erase by the stationary heads 31 and 32 and thus makes optimum use of the effective recording area of the tape. As above suggested, however, four or more transducer heads may be used for special applications.

Once a specific number of transducer assemblies 16 has been decided upon for the video tape recording apparatus of the present invention, it is desirable to synchronize the rate at which the tape 11 is longitudinally advanced past the recording station 13 with the rate at which the turnable 17 is rotated, so that adjacent recorded traces 15 are, at their ends, as closely spaced as possible without physical overlap at points downstream of the erase heads 31, 32.

FIGURE 3 depicts the end portion of one of the tracks 15, and will be used to illustrate the determinations of the optimum distance $s$ which the leading edge of the track must move so that the leading edge of the next recorded track will initially just coincide with the trailing edge of the first recorded track.

Since the number of degrees of preserved recorded track, downstream of the auxiliary erase heads 31, 32, is equal to the angular spacing between adjacent transducer assemblies 16 carried by the turntable 17, and the angle $\phi$ in FIGURE 3 is one-half of this angular spacing, then:

$$\phi = 360°/2N \qquad (1)$$

where:

N is the total number of transducer assemblies carried by the turntable.

It is also apparent from FIGURE 3 that the small arc of the inner leading edge of the track 15, bounded by the angle $\phi'$, very closely approximates a straight line and that:

$$\phi' = \phi \qquad (2)$$

Therefore:

$$t/s = \cos \phi \qquad (3)$$

where:

$t$ is the radial width of the recorded track between its leading and trailing edges;

and $$s = t \sec \phi = t \sec \frac{360°}{2N} \qquad (4)$$

Since this is the distance the tape must advance for each of N transducer assemblies, the total distance D which the tape must advance for a single complete revolution of the turntable 17 and all N transducer assemblies is:

$$D = Nt \sec \frac{360°}{2N}, \text{ where } N \geq 3 \qquad (5)$$

For the arrangement of FIGURE 1, where $N=3$, the distance D which the tape must advance per revolution of the turntable 17 would be (substituting values into Equation 5) $3t$ sec 60° or $6t$. Hence, the tape 11 would, for each revolution of the turntable 17, advance a distance equal to 6 times the width of a recorded track 15 in order to provide the greatest number of recorded tracks per unit length of tape and still avoid physical overlapping at the ends of adjacent tracks. The value of the track width $t$ is readily ascertainable in each case from the physical dimensions of the recording heads 20.

Since synchronization between the rotating turntable 17 and the means for advancing the tape 11 past the recording station 13 is critical, it is desirable that the tape advancing means and the shaft 18 of the turntable 17 be operated from a single mechanical drive source. FIGURE 1 shows such an arrangement in which an electrical motor 35 has its mechanical output directed through a gear box 36, in appropriate velocity ratios, to the drive shaft 18 and the tape advancing means. Since the motor 35 and gear box 36 are of conventional design, well known in the art, they are not discussed in further detail.

The embodiments of the invention shown in FIGURES 4 through 7 are for use with single transducer assemblies, as opposed to the plurality of such units in the arrangement of FIGURE 1. Single transducer magnetic recording is useful for recording a sequence of time-interupted signal traces, where a significant retrace time between adjacent recorded traces is not a major problem.

Referring now particularly to the video tape recording apparatus of FIGURES 4 and 5, there is shown an arrangement for reciprocating a transducer assembly 50 transversely in an elliptical path back and forth across the magnetizable area of a longitudinally advancing tape 51, as it moves past a recording station 53.

The transducer assembly 50 includes an erase head 54 and a recording head 55, each of which is always in physical contact with the magnetizable area of the tape 51 at all points in the elliptical path 56, and is driven by a suitable drive mechanism 57 described in more detail below.

As the transducer assembly 50 traverses the tape 51 during the forward (upper) stroke, the erase head 54 *leads* the recording head 55, thereby preparing a clear, demagnetized path to receive the magnetically recorded transverse tracks 58. During the back (lower) stroke, when the transducer assembly 50 is retracing to prepare for the recording of a new track 58, the erase head 54 *follows* the recording head 55 and thereby erases any signals which may be recorded by the recording head during the retrace interval. By virtue of this arrangement, the recording head 55 need not be disconnected from the video signal source during the retrace interval and, hence, switching transients are avoided.

The mechanism for reciprocating the transducer assembly in an elliptical path includes a lever arm 60 which carries the transducer assembly at one end and is pivotally connected at the other end, by an appropriate crank pin 61, to a crank 62. The crank 62 is, in turn, fixedly secured to a rotatable crank shaft 63 which may be driven by any suitable means well known in the art.

The lever arm 60 is dovetailed (FIGURE 5) for sliding longitudinal engagement within a slide-pivot post 64 which is located intermediate the two ends of the arm. The pivot post 64 is translationally fixed, but rotatable on the axis of a pivot shaft 65 secured thereto.

The axes of rotation of the crank shaft 63 and the slide-pivot post 64 are centrally aligned over the tape 51. The dimensions and spacing between the various parts of the drive mechanism 57 are selected so that the major axis of the elliptical path followed by any portion of the transducer assembly 50 will never exceed the width of the magnetizable area of the tape 51. Hence, as in the arrangement of FIGURE 1, bounce, flutter and variable reluctance distortion are completely eliminated.

Figures 6, 7, 8:
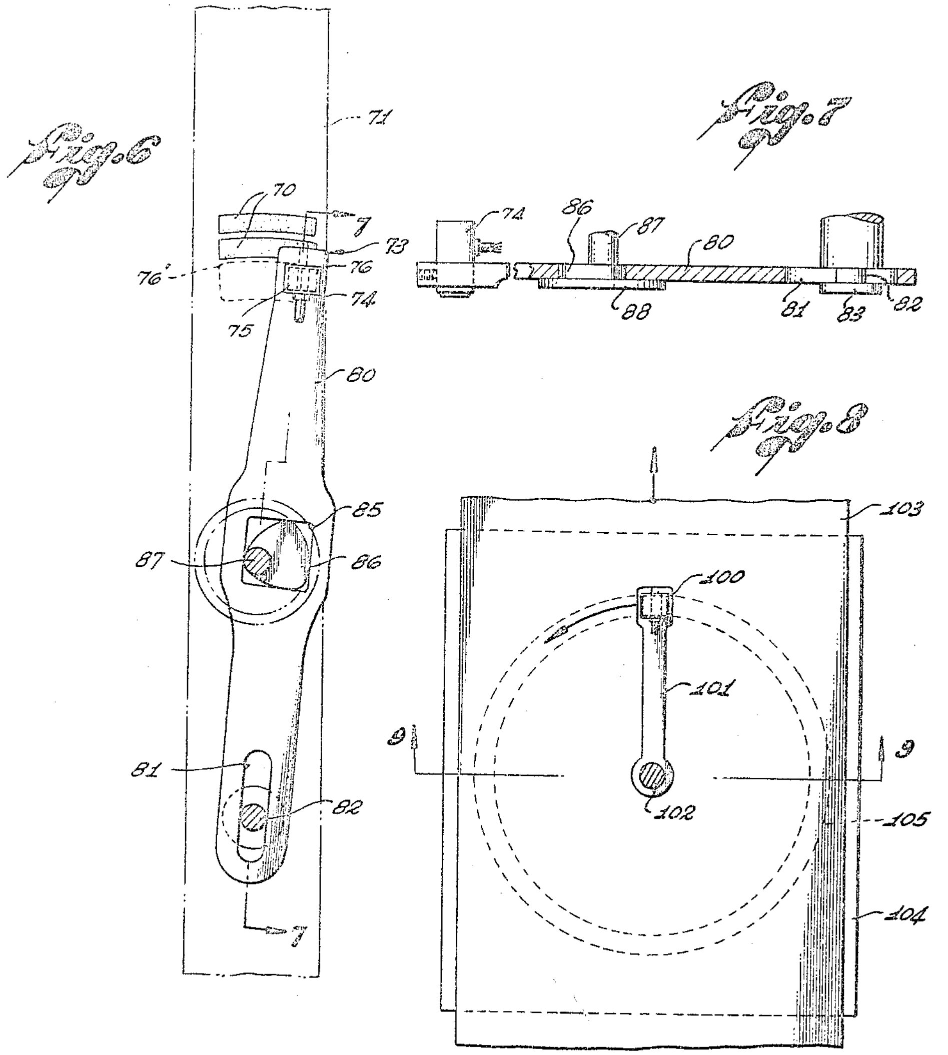
FIGURE 6 is a partial plan view of another embodiment of the invention, in which a single transducer assembly is constrained to a quasi-rectangular path in traversing a magnetic tape.
FIGURE 7 is a fragmentary sectional view, taken along the line 7—7 of FIGURE 6, illustrating additional details of the cam and pivot post structure used in the arrangement of FIGURE 6.
FIGURE 8 is a partial plan view of a simplified embodiment of the invention, and illustrates the structure of a platen for improving the uniformity of contact between the magnetic tape and the transducers of the recording apparatus.

Referring now particularly to FIGURES 6 and 7, there is shown another tape recording arrangement, in accordance with the present invention, for recording a sequence of successive, time-interrupted transverse tracks 70 upon the magnetizable area of a tape 71 as it is longitudinally advanced past a recording station 73.

The process of recording the tracks 70 is accomplished by a transducer assembly 74 which includes an erase head 75 and a recording head 76 arranged in essentially the same manner as the embodiments of the invention shown in FIGURES 1 and 4. The primary distinction between the apparatus of FIGURE 6 and that of FIGURE 4 resides in the shape of the path followed by the transducer assembly in reciprocating back and forth across the width of the tape. In the FIGURE 6 embodiment, the transducer assembly 74 follows a quasi-rectangular path 76, as opposed to the elliptical path 56 followed by the transducer assembly 50 of FIGURE 4. The primary advantage of the quasi-rectangular path over the elliptical path is that the former by virtue of the minimal curvature of each track, permits closer spacing between adjacent recorded tracks 70, and thereby increases the quantity of recorded information per unit length of the tape 71. The manner in which the transducer assembly 74 is constrained to follow the quasi-rectangular path 76 will next be described.

The transducer assembly 74 is carried at the distal end of an arm 80 and, as in the other embodiment, is always maintained in physical contact with the magnetizable area of the tape 71. The proximal end of the arm 80 is provided with a centrally disposed longitudinal guide slot 81 through which a fixed pivot post 82 extends. The pivot post 82 is maintained in engagement with the slot 81 by an appropriately positioned locking disc 83 (FIGURE 7). The guide slot 81 and pivot post 82 provide a slide-pivot fulcrum for the proximal end of the arm 80 opposite that carrying the transducer assembly 74.

Intermediate the two ends of the arm 80, the arm is provided with a rectangular aperture 85. Positioned within the aperture 85 is a trianguloid cam 86 which abuts the inner walls defining the aperture and is rotatable by a drive shaft 97. A locking disc 88 (FIGURE 7) is utilized to maintain the cam 86 within the aperture 85 as the cam is rotated.

As in the arrangement of FIGURE 5, the axes of the pivot post 82 and the drive shaft 87 are disposed in central alignment with the tape 71.

The cam 86 is provided with three lobes, as shown, and rotates on a shaft 87 located adjacent one of the lobes. Thus, as the cam 86 rotates, the lobes successively pressure-engage the edges of the aperture 85 and drive the arm 80 in a generally rectangular path. The lateral dimension of the arm path at the distal end is multiplied due to the spacing of the fulcrum pivot 82 and the cam shaft 87 and thus is (in the illustrated embodiment) about twice the "throw" of the cam. There being no such multiplication of the cam motion along the tape axis, the dimension of the rectangular path 76 in that direction is substantially equal to the cam throw.

The spacing between the axes of the pivot post 82 and the drive shaft 87, as well as the dimensions of the arm 80 and cam 86 may be varied to adjust the transverse width and shape of the path 76 followed by the transducer assembly 74.

Figure 9:
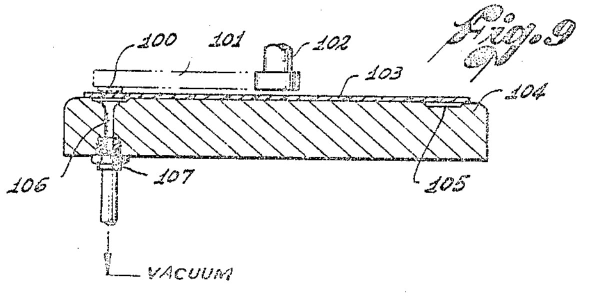
FIGURE 9 is a sectional view, taken along the line 9—9 of FIGURE 8, and illustrates the manner in which the tape is held against the platen.

FIGURES 8 and 9 serve to illustrate a novel tape platen structure particularly suited for use with transducer assemblies which remain in physical contact with the magnetic tape at all times.

FIGURES 8 and 9 show a simplified semi-schematic version of the video tape recording apparatus of the present invention, in which a transducer assembly 100 is carried upon one end of an arm 101, the other end of the arm being secured for rotation to an appropriate drive shaft 102. The transducer assembly 100 is in physical contact with a longitudinally advancing tape 103 which passes over a low-friction platen 104, having friction inserts of sapphire, Teflon or the like.

The upper surface of the platen 104, which abuts the tape 103, is provided with a shallow, circular groove 105. The groove 105 has the same shape and dimensions as the path followed by the transducer assembly 100 as the latter is rotated in engagement with the tape 103. Moreover, the platen 104 is positioned to align the groove so that it coincides with the locus of the reciprocating transducer assembly. However, the width of the groove 105 is slightly wider than the area of contact between the transducer 100 and the tape 103.

As will be apparent from FIGURE 9, the groove 105 is partially evacuated by connection, as at passage and fitting 106–107, to a low pressure means such as a vacuum pump (not shown).

In operation, the evacuated groove 105 holds the tape 103 in sliding engagement with the platen 104 as the tape is longitudinally advanced past the recording station. Thus the tape is held accurately in a plane determined by the mouth or top edges of the groove 105. Moreover, the evacuated groove affords a resilient seating of the tape 103 against the transducer assembly 100 and thereby minimizes frictional wear, while insuring continuous and uniform physical contact between the transducer assembly and the tape.

The video tape recording apparatus of the present invention satisfies a long-existing need in the television and related industries for a simple and economical arrangement for eliminating the bounce and flutter distortion problems which have so long plagued the prior art devices. In addition, the present invention also eliminates switching and variable reluctance transients and may be used, if desired, to completely eliminate retrace time between successive recorded tracks. Moreover, the arrangement of the present invention wholly obviates the need for critically aligned tape guides, and thereby greatly facilitates the ease and simplicity of the recording and playback processes.

It will be apparent from the foregoing that, while particular forms of my invention have been illustrated and described, various modifications can be made without departing from the spirit and scope of my invention. Accordingly, I do not intend that my invention be limited, except as by the appended claims.

I claim:

1. In a tape recording device, the combination comprising:

a tape medium including a magnetizable width portion uniformly disposed therealong;

magnetic transducer means capable of reciprocating in a continuous path back and forth across said magnetizable portion of said tape medium for recording transverse information tracks, said magnetic transducer means including a pair of tape heads, one of said tape heads being an erase head and the other of said tape heads being a recording head, said erase head being positioned such that it leads said recording head during the reciprocation stroke for recording one of said transverse information tracks and said erase head lags said recording head during the return reciprocation stroke preparatory to recording the next of said transverse information tracks;

transport means for advancing said tape medium at a substantially uniform velocity past said transducer means as said transducer means scans said tape medium, the rate at which said transport means advances said tape medium bearing a constant ratio with respect to the rate at which said transducer means reciprocates;

and means for maintaining said transducer means in physical contacting relationship with said tape medium at all times during the operation of said recording device.

2. An arrangement for recording successive transverse tracks across a magnetizable portion of a tape comprising:

magnetic transducer means movable in an ellipitical path for recording said transverse magnetic tracks across said tape, said transducer means including at least one pair of tape heads in side-by-side relationship, one of said tape heads of said pair being an erase head and the other of said tape heads being a recording head, the erase head of each pair of tape heads leading the respective recording head of the same pair only during the portion of said elliptical path when a desired magnetic track is being recorded, said erase head lagging said recording head during the remaining portion of said elliptical path;

drive means for reciprocating said transducer means back and forth in an elliptical path only across the magnetizable portion of said tape;

means for advancing said tape at a rate which bears a constant ratio to the rate at which said drive means reciprocates said transducer means across said tape;

and means for maintaining all the tape heads of said transducer means in physical contact with the magnetizable portion of said tape at all times while said transducer means is being reciprocated across said tape.

3. An arrangement for recording successive transverse tracks across a magnetizable portion of a tape comprising, in combination:

magnetic transducer means movable in a quasi-rectangular path for recording said transverse magnetic tracks across said tape, said transducer means including at least one pair of tape heads in side-by-side relationship, one of said tape means of said pair being an erase head and the other of said tape heads being a recording head, the erase head of each pair of tape heads leading the respective recording head of the same pair only during the portion of said quasi-rectangular path when a desired magnetic track is being recorded, said erase head lagging said recording head during the remaining portion of said quasi-rectangular path, all the tape heads of said transducer means being maintained in physical contact with the magnetizable portion of said tape at all times while said transducer means is moving;

drive means for reciprocating said transducer means back and forth in a quasi-recangular path only across the magnetizable portion of said tape; and means for longitudinally advancing said tape at a rate which bears a constant ratio to the rate at which said drive means reciprocates said transducer means across said tape.

References Cited by the Examiner

UNITED STATES PATENTS

| | | | |
|---|---|---|---|
| 2,924,668 | 2/1960 | Hoshino et al. ----- | 179—100.2 |
| 2,964,324 | 12/1960 | Brasseur ---------- | 179—100.2 |
| 3,050,596 | 8/1962 | Whitney et al. ------ | 179—100.2 |

BERNARD KONICK, *Primary Examiner.*

A. I. NEUSTADT, *Assistant Examiner.*